United States Patent [19]
Horie

[11] Patent Number: 4,881,215
[45] Date of Patent: Nov. 14, 1989

[54] OPTICAL RECORDING MEDIUM AND METHOD FOR CORRECTING ANGULAR DEVIATION THEREOF

[75] Inventor: Kiyoshi Horie, Tokyo, Japan

[73] Assignee: Computer Services Corporation, Tokyo, Japan

[21] Appl. No.: 936,723

[22] Filed: Nov. 25, 1986

[30] Foreign Application Priority Data

Nov. 26, 1985 [JP] Japan .................... 60-265914

[51] Int. Cl.$^4$ .................... G06K 7/015; G11B 7/09
[52] U.S. Cl. .................... 369/44; 369/46; 369/54; 369/58; 235/454
[58] Field of Search .................... 369/32, 44–46, 369/58, 112, 54, 275; 235/454, 456, 436, 470, 487, 462, 485

[56] References Cited

U.S. PATENT DOCUMENTS

| | | | |
|---|---|---|---|
| 3,852,573 | 12/1974 | Dolch | 235/456 |
| 4,145,758 | 3/1979 | Drexler et al. | 369/44 |
| 4,163,157 | 7/1979 | Guignard et al. | 250/561 |
| 4,213,040 | 7/1980 | Gokey et al. | 235/487 |
| 4,269,917 | 5/1981 | Drexler et al. | 430/16 |
| 4,273,758 | 7/1981 | Drexler et al. | 430/616 |
| 4,278,756 | 7/1981 | Bouldin et al. | 430/414 |
| 4,360,728 | 11/1982 | Drexler | 235/462 |
| 4,365,324 | 12/1982 | Michaelis | 369/44 |
| 4,500,777 | 2/1985 | Drexler | 235/487 |
| 4,542,288 | 9/1985 | Drexler | 235/487 |
| 4,544,835 | 11/1985 | Drexler | 235/487 |
| 4,588,882 | 5/1986 | Buxton | 235/487 |
| 4,598,196 | 7/1986 | Pierce et al. | 235/454 |
| 4,598,393 | 7/1986 | Pierce et al. | 235/46 |
| 4,623,784 | 11/1986 | Haddock et al. | 369/44 |
| 4,634,850 | 1/1987 | Pierce et al. | 237/487 |
| 4,652,730 | 3/1987 | Marshall | 235/456 |
| 4,692,603 | 9/1987 | Brass et al. | 235/470 |
| 4,695,991 | 9/1987 | Hudson | 369/46 |

FOREIGN PATENT DOCUMENTS

0200434 5/1986 European Pat. Off. .
2167595 5/1986 United Kingdom .

Primary Examiner—Alan Faber
Assistant Examiner—Robert A. Weinhardt
Attorney, Agent, or Firm—Cushman, Darby & Cushman

[57] ABSTRACT

A method and apparatus for correcting an angular deviation or a skew of an optical recording medium in the reading/writing of data from or into the medium and a specific optical recording medium to which this method and apparatus are applicable. The optical recording medium comprises strip patterns formed on part of a substrate. This optical recording medium is relatively moved in a direction of the width of the strip patterns with respect to a pattern detecting device so that an optical system of the pattern detecting device detects the patterns at plural detecting points along the length of the strip patterns. A correction control device counts the number of the strip patterns passed, according to the relative movement as mentioned above and compares the count values at the respective detecting points to detect an angular deviation amount in a plane of the optical recording medium. The angular deviation is corrected by a rotation drive mechanism based on the detected angular deviation amount and direction of the deviation.

10 Claims, 4 Drawing Sheets

OPTICAL RECORDING MEDIUM AND METHOD FOR CORRECTING ANGULAR DEVIATION THEREOF

FIELD OF THE INVENTION

This invention relates to an optical recording medium adapted to bear data optically reproducible and a method and apparatus for correcting an angular deviation or a skew of the optical recording medium in data reading/writing from/into the medium.

RELATED ARTS

Recently, optical recording media have come into the limelight, in place of an IC card, as pocket high-density recording media handy to carry.

The optical recording media, includes, for example, (1) an optical recording medium having small pits or projections on a light reflecting face thereof so as to record digital signals utilizing a difference in reflectivity due to the pits or projections; (2) an optical recording medium having light and dark patterns on a light reflecting face or a light transmitting face thereof to record digital signals; and (3) an optical recording medium having polarized patterns on a light reflecting or transmitting face thereof to record digital signals. The data recorded in these optical recording media, as mentioned above, are read by irradiating light beams such as laser beams; to detect optical changes of reflected or transmitted beams due to the difference in reflectivity or polarization and converting the changes into digital values.

Such optical recording media enable extremely high-density data recording. Therefore, even if the optical recording media are formed in a card shape, the storage capacity is by far larger than that of the existing IC card. The optical recording media of a card shape can be used for various purposes which have heretofore not been realized because of a shortage of the storage capacity, such as a personal medical record, a dictionary or the like.

However, only the optical recording media of a disk shape, such as a compact disk or an optical disk, have been put into practical use. Optical recording media of a card shape have not yet been practically used. This is due to a difficulty for a head to follow the data trains in the data recording/reproducing. The disk-shaped medium is relatively easy for a head to follow the data trains by controlling the disk rotation and the radial head movement because the data are recorded concentrically or spirally.

On the other hand, the optical recording medium of a card or sheet shape (hereinafter referred to simply as "card shape") has data trains arranged in parallel in an X or Y direction. Therefore, in the recording/reproducing of the data, for example, during the reproducing of the data, the recording medium and the reproducing head are relatively moved in the X or Y direction to follow the data train. In the optical recording medium of a card shape, however, it is difficult to follow the data trains if there is an angular deviation or skew in a plane of the optical recording medium. In this case, the position of an objective lens may be adjusted to correct a slight deviation. However, there is a limit in correction by such an adjustment. If the deviation exceeds $\pm 400$ $\mu$m, it is quite difficult to correct the deviation. In this case, the posture of the optical recording medium itself should be corrected.

Of course, the correction of the posture of the optical recording medium is possible by the present state of art. In general, however, a sensor for detecting the angular deviation with high accuracy, a circuit for controlling the drive of the sensor and a circuit for processing the detected signal from the sensor must be complex. By this reason, the recording/reproducing apparatus will inevitably be costly. This is rather fatal for the recording/reproducing apparatus, especially for the reproducing apparatus. More particularly, it is crucial for the optical recording medium, such as a personal medical record, to be able to easily reproduce the record whenever required.

The present invention has been achieved to obviate the problems as described above; and it is an object of the present invention to provide an optical recording medium and a method and apparatus for easily correcting a possible angular deviation or skew of the optical recording medium without increasing the manufacturing cost of the recording/reproducing apparatus.

DISCLOSURE OF THE INVENTION

The present invention features an optical recording medium comprising a substrate, which has a data recording portion and a skew mark portion formed of a plurality of optically detectable strip patterns.

The invention further features a method for correcting an angular deviation of an optical recording medium, which comprises: relatively moving the optically recording medium having a plurality of optically detectable strip patterns formed at part of a substrate of the optical recording medium, in a direction of the width of the strip pattern, with respect to a pattern-detecting means; detecting said strip patterns by said pattern-detecting means at a plurality of detecting points along the length of the strip patterns to count the number of the strip patterns passed through the respective detecting points according to the relative movement of the medium; comparing the count values obtained at the respective detecting points to detect an angular deviation amount in a plane of the optical recording medium and a direction of the deviation; and correcting said angular deviation of the optical recording medium on the basis of said angular deviation amount and said direction of the deviation.

The present invention further features an apparatus for correcting an angular deviation of an optical recording medium, which comprises an optical system functioning as a pattern detecting means for detecting an angular deviation of the optical recording medium; a rotation drive mechanism for rotating said optical recording medium based on a correction signal; and a correction control device for detecting an angular deviation amount and a direction of the deviation on the basis of a signal from said optical system to transmit the correction signal to said rotation drive mechanism.

The strip patterns provided on the optical recording medium to which the present invention is applied may be any kind of patterns as long as they are optically detectable. The strip patterns may be formed during the manufacturing process of the optical recording medium or may be formed afterward by utilizing a data writing means. In the latter case, the strip patterns are formed in the same mode as the data writing in the data recording portion of the optical recording medium.

The strip patterns may, for example, be formed as projected ribs or recessed grooves at predetermined spaces on a light reflecting face of a substrate of the optical recording medium or formed, by photolithography, as light and dark stripes at predetermined spaces on a light reflecting or transmitting face of the substrate of the optical recording medium.

The strip patterns can be detected by receiving reflected or transmitted beams from or through the plural detecting points and converting the received beams into electrical signals. In this case, since the optical recording medium is relatively moved in the direction of the width of the strip patterns, the signals from the detecting points become high or low in levels as the strip patterns pass the detecting points. Thus, pulsive signals are obtained.

The detecting points may be suitably selected according to the position of the detecting means; but they may, of course, be fixed. In general, the detecting points are determined by light beams irradiated from an optical system functioning as the detecting means as will be described in detail later.

The number of the strip patterns passed is obtained by counting the pulsive signals as described above by counters. The counters stop the counting when they count up a predetermined number of strip patterns, at the largest of all the strip patterns.

The count values are compared, for example, by an arithmetic circuit such as a subtractor or an up-down counter. The count values are compared in magnitudes and an absolute value of a difference between the count values is obtained. Thus, a direction of the angular deviation and an angular deviation amount are obtained respectively The direction of the deviation and the angular deviation amount are transmitted to the rotation drive mechanism as a correction signal.

A signal indicative of the direction of the angular deviation instructs a direction in which the optical recording medium should be rotated by the rotation drive mechanism and a signal indicative of the angular deviation amount instructs a rotation angle.

OPERATION

In the present invention, the optical recording medium having a plurality of optically detectable strip patterns are relatively moved in a direction of the width of the strip patterns, while being subjected to the detection at plural detection points along the lngth of the strip patterns and the number of the strip patterns is counted as the patterns pass through the respective detecting points, to obtain an angular deviation amount and a direction of the deviation from the count values.

The angular deviation amount $\theta$ is expressed by a distance L between selected two detecting points, a difference n between the count values at said selected two detecting points and a space d between the strip patterns as follows:

$$\theta = \sin^{-1}\frac{nd}{L} \quad (1)$$

The direction of the deviation is determined based on the results of the comparison in magnitudes between the count values at the respective detecting points For this purpose, it will suffice to have two detecting points. However, if three or more detecting points are provided, comparison can be made for plural combinations and possible detection error can be found.

The angular deviation or skew of the optical recording medium can be corrected on the basis of the angular deviation amount and the direction of the deviation.

Thus, the possibly caused angular deviation of the optical recording medium can be easily corrected without increasing the cost of the recording/reproducing apparatus.

PREFERRED EMBODIMENT OF THE INVENTION

Figure 1:
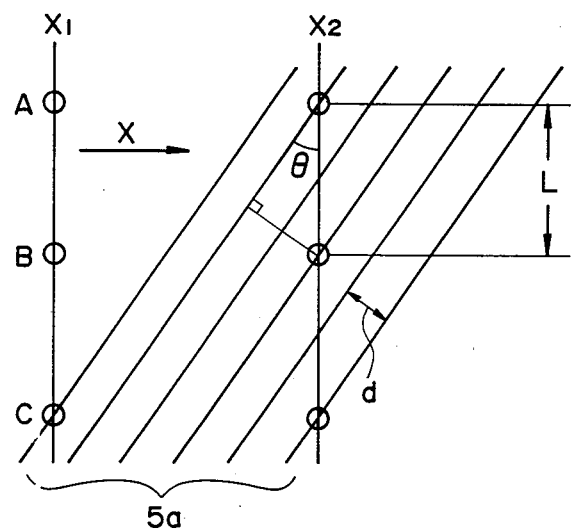
FIG. 1 is an explanatory view illustrating a principle of the angular deviation detection according to one embodiment of the present invention.
Figure 2:
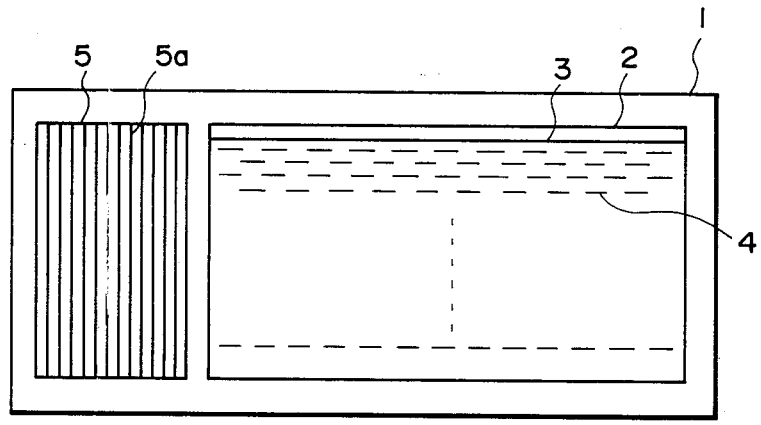
FIG. 2 is a plan view of one form of a card type optical recording medium to which a correcting method for an angular deviation of the present invention is applied.

A preferred embodiment of the present invention will now be described referring to the drawings.

Structure of the Embodiment

FIGS. 1 to 5 illustrate a method for correcting an angular deviation according to one embodiment of the present invention.

A card type optical recording medium, to which the present embodiment is applied, comprises a data recording portion 2 and a skew mark portion 5 provided on a substrate 1.

Figure 6:
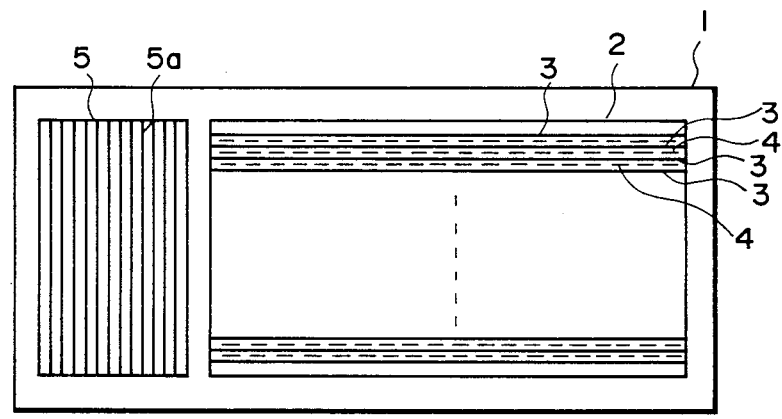
FIG. 6 is a plan view of another form of a card type optical recording medium to which the method of the present invention is applied.
Figure 7:
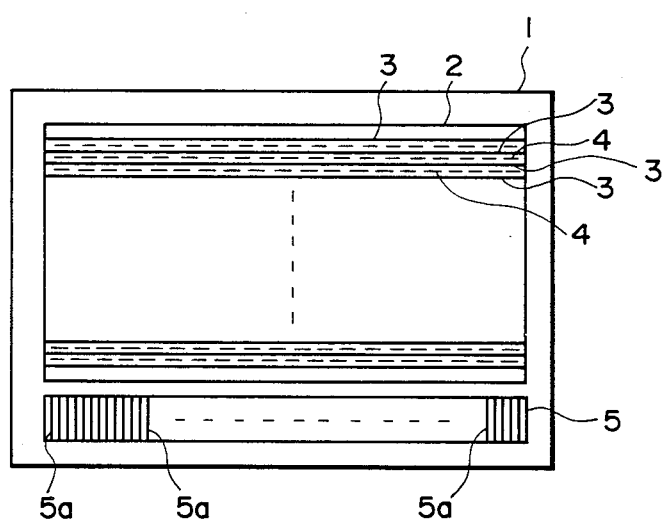
FIG. 7 is a similar plan view of yet another form of a card type optical recording medium to which the method of the present invention is applied.

The data recording portion 2 has a plurality of tracks 4 in a longitudinal direction of the substrate for forming data trains (shown by broken lines in FIG. 2), which are disposed in parallel with each other. Data are recorded on or along the tracks 4. The reproduction of the data is carried out through a relative movement of a head (not shown) along the tracks 4. More specifically, a track guide 3 is provided in parallel with the tracks 4 and the track guide 3 is used to move the head along the data trains. This track guide 3, however, may be omitted depending upon the type of tracking systems. The track guide 3 and the track 4 may be provided in pair as illustrated in FIGS. 6 and 7.

Figure 3:
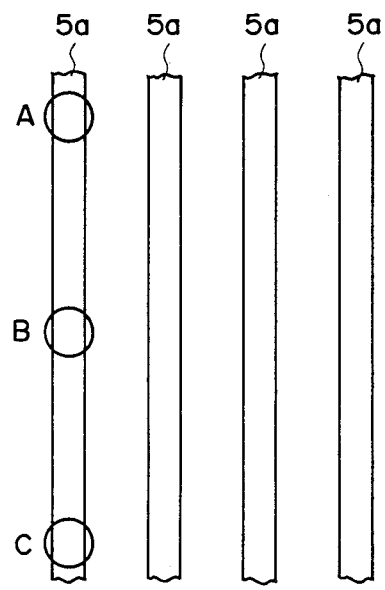
FIG. 3 is a fragmentary enlarged plan view of strip patterns used for detection of an angular deviation of the card type optical recording medium.

The skew mark portion 5 is provided at a side portion of the substrate 1 in the present embodiment. This skew mark portion 5 includes a plurality of strip patterns 5a in a perpendicular direction to the tracks 4 as illustrated in FIG. 3. The strip patterns 5a are formed as convexed strips having a predetermined width and disposed, like stripes, at predetermined intervals.

Figure 4:
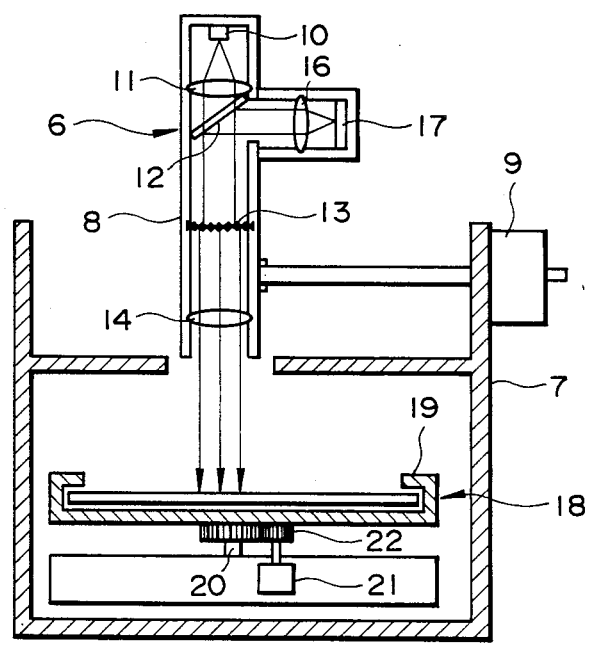
FIG. 4 is a sectional view of one form of a rotation drive for an optical system for detecting strip patterns and the optical recording medium, which is employable in the embodiment of the present invention.

The optical system for optically detecting the strip patterns 5a is so constructed as illustrated in FIG. 4. This optical system 6 is provided in a lens tube 8 which is swingably supported by a housing 7. The lens tube 8 is pivoted by a step motor 9. Within the lens tube 8 there is provided a laser source 10 such as a semiconductor laser, a collimator lens 11, a beam splitter 12 for separating reflected beam from irradiated beam, a grating 13 for dividing the irradiated beam into three an objective lens 14, an ocular 16 for forming an image from the reflected beam separated by the beam splitter 12, and a photodetective element array 17 for converting the image-formed reflected light into an electric signal.

Detection points for the strip patterns by the above-mentioned optical system are shown by small circles in FIG. 3. These detection points correspond to the three irradiated beams divided by the grating 13. The photodetective element array comprises a plurality (three in the embodiment as illustrated) of photodetective elements corresponding to the number of the detection points.

A rotation drive mechanism 18 provided at a lower portion of the housing 7 comprises a holding portion 19 for holding the substrate 1 of the optical recording medium thereon, a shaft 20 for rotatably supporting the holding portion 19, a motor 21 for rotating the shaft 20 and a gear mechanism 22 for transmitting the drive of the motor 21 to the shaft 20.

Figure 5:
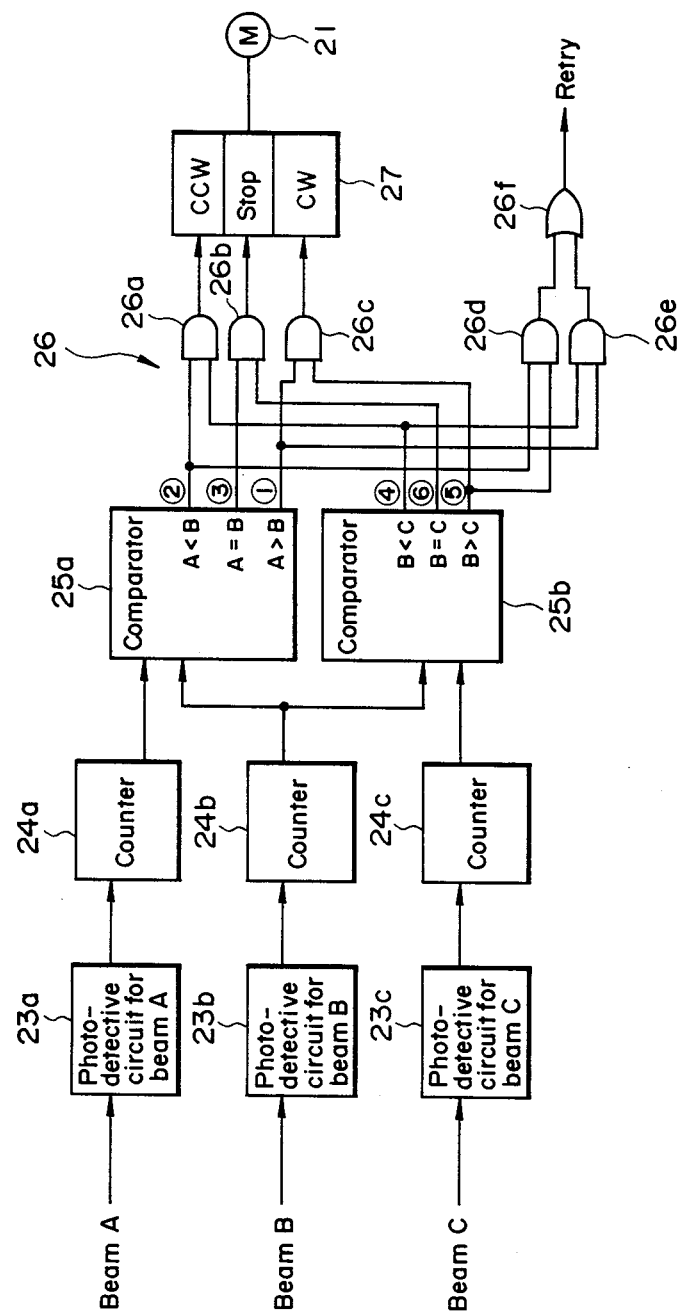
FIG. 5 is a block diagram of a correction control system for correcting an angular deviation of the optical recording medium based on a detection signal of the strip pattern.

A correction control system, which detects an angular deviation amount and a direction of the deviation from a signal from the optical system 6 to transmit a correction signal to the rotation drive mechanism 18, is constructed as illustrated in FIG 5. The correction control system comprises three photodetective circuits 23a, 23b, 23c corresponding to the three detection points, counters 24a, 24b, 24c for counting pulses output from the photodetective circuits 23a, 23b, 23c, respectively, comparators 25a, 25b, 25c for comparing the count values and calculating absolute values of differences between the count values to obtain a deviation, a decision circuit for deciding the direction of the deviation based on the comparison results, and a drive control circuit for controlling the drive of the motor 21 according to the decision and the deviation amount. The decision circuit 26 comprises AND gate circuits 26a to 26e and an OR gate circuit 26f.

The present embodiment can be carried out by the apparatus as described above. The operation principle will be described referring to FIG. 1.

When the substrate 1 of the optical recording medium is fed by a feeding mechanism (not shown) to relatively move the three strip-pattern detection points A, B and C disposed in a line, in a direction of X, with respect to the substrate, the detection points are moved from a position X1 to a position X2. In the course of the moving of the detection points, the detection point C first detects a strip pattern 5a. Subsequently, the detection points B and A sequentially detect the pattern 5a. By this time, a plurality of strip patterns 5a have passed through the detection point C. When the number of the strip patterns 5a detected upon their passing through the point C is up to a predetermined number, the feeding of the substrate 1 is stopped. At that time, the detection points are positioned at X2.

During this relative movement between the substrate 1 and the detection points, laser beam from the laser source 10 is introduced into the detection points A, B and C through the collimater lens 11, the beam splitter 12, the grating lens 13 and the objective lens 14 to irradiate the detection points.

The irradiated beams are highly reflected at the convexed portions of the strip patterns 5a and weakly reflected at recessed portions between the convexed portions. This difference in reflectivity is utilized for the detection of the strip patterns 5a.

More particularly, the reflected beams return, following the reverse course, to the beam splitter 12 where they are separated from the path of the irradiated beams. The reflected beams are, then, incident upon the photodetective element array 17 through the ocular 16 and converted into electric signals.

These electric signals are shaped into pulses by the photodetective circuits 23a, 23b and 23c, respectively. The pulses output from the photodetective circuits 23a, 23b and 23c are counted by the corresponding counters 24a, 24b and 24c, respectively. The count values a, b and c of the respective counters are compared (between a and b and between b and c) at the comparators 25a and 25b. At the same time, absolute values of differences between the count values are calculated to obtain a deviation amount. The deviation amount is obtained by calculating a difference between the values a and b in the present embodiment.

The operation for deciding which value is larger is carried out by a logical operation by the AND gate circuits 26a to 26e and the OR gate circuit 26f of the decision circuit 26. If $a>b$ and $b>c$ in the results of the operation, it is determined that the angular deviation is clockwise, while if $a<b$ and $b<c$, it is determined that the angular deviation is counterclockwise. In contrast, if $a=b$ and $b=c$, it is determined that the optical recording medium is not deviated angularly or skewed, but it is in a normal position.

In this connection, it is to be noted that if the operation results show a combination of $a>b$ and $b<c$, or $a<b$ and $b>c$, then it is determined as a detection error because the results are inconsistent. In this case, a retry signal is output from the OR gate circuit 26f.

The angular deviation amount is obtained by formula 1 as described above. In the case as illustrated, a difference between the count values a and b is obtained and the angular deviation amount is calculated from the obtained difference together with a distance L between the detection positions A and B and a spacing between the strip patterns d.

The angular deviation amount thus obtained and the signal indicative of the direction of the deviation are transmitted to the drive control circuit 27 as a correction signal. The drive controls circuit 27 control the drive of the motor 21 to rotate the shaft 20 for correcting the optical recording medium into a correct position.

After the optical recording medium has been put into a correct position, data is read from or written into the data recording portion 2. The optical system as described above may also be used as a reading/writing head. In this case, the angular deviation correction and the data reading/writing can be achieved by the same optical system, which can reduce the total manufacturing cost.

Modification of Embodiment

Although the skew mark portion is formed substantially along the entire length of the width of the card type optical recording medium in the embodiment as described above, they may extend only partly in the width.

Alternatively, the skew mark portion may be provided in a longitudinal direction of the card type optical recording medium along the data recording portion as illustrated in FIG. 7.

The foregoing embodiment is described referring to the card type optical recording medium, but the present invention may be applied to any other type of optical recording medium so far as it can be read or written without being rotated.

In the foregoing embodiment, the light beams divided into three portions are used without further processing, but the outer two portions of the beams may be directed outwardly by using an optical system such as reflectors to widen spacings from the central beam portion. The widening of the spacings from the central beam portion will improve an accuracy of the angular deviation detection. In this connection, it is to be noted that the optical system used for widening the spacings between the beam portions may be retractable from the beam path. When this optical system is retractable from the path, it will not interfere with the data writing.

I claim:

1. A method for correcting an angular deviation of an optical recording medium, which comprises:
   relatively moving the optical recording medium having a plurality of optically detectable strip patterns having a length and a width and formed on part of a substrate of the optical recording medium, in a direction across the width of the strip pattern, with respect to a pattern-detecting means;
   detecting said strip patterns by said pattern-detecting means at a plurality of detecting points along the length of the strip patterns to count the number of the strip patterns passed through the respective detecting points according to the relative movement of the medium;
   comparing the count values obtained at the respective detecting points to detect an angular deviation of the deviation; and
   correcting said angular deviation of the optical recording medium on the basis of said angular deviation amount and said direction of the deviation.

2. A method for correcting an angular deviation of an optical recording medium as claimed in claim 1, wherein said optical recording medium has strip patterns provided in the form of convexed ribs or concaved grooves at predetermined spaces.

3. A method for correcting an angular deviation of an optical recording medium as claimed in claim 1, wherein said strip patterns are provided in the form of light and dark stripes at predetermined spaces produced by photolithography.

4. A method for correcting an angular deviation of an optical recording medium as claimed in claim 1, wherein said strip patterns are detected by receiving beams reflected from or transmitted through the predetermined detecting points along the length of the strip patterns and converting the beams into electric signals.

5. A method for correcting an angular deviation of an optical recording medium as claimed in claim 1, wherein said optical recording medium is relatively moved in the direction of the width of the strip patterns to generate signals of the respective detecting points in the form of pulse signals whose levels become high or low as they pass through the patterns.

6. A method for correcting an angular deviation of an optical recording medium as claimed in claim 4, wherein said optical recording medium is relatively moved in the direction of the width of the strip patterns to generate signals of the respective detecting points in the form of pulse signals whose levels become high or low as they pass through the patterns.

7. A method for correcting an angular deviation of an optical recording medium as claimed in claim 5, wherein said pulse signals are counted by a counter to count the number of the strip patterns.

8. A method for correcting an angular deviation of an optical recording medium as claimed in claim 6, wherein said pulse signals are counted by a counter to count the number of the strip patterns.

9. A method for correcting an angular deviation of an optical recording medium as claimed in claim 7, wherein a signal indicative of the direction of the deviation is derived based on the relation in magnitude between the count values to be compared and a signal indicative of the angular deviation amount is derived based on an absolute value of the difference between said count values to generate a correction signal for rotating the optical recording medium to correct the angular deviation of said optical recording medium.

10. A method for correcting an angular deviation of an optical recording medium as claimed in claim 8, wherein a signal indicative of the direction of the deviation is derived based on the relation in magnitude between the count values to be compared and a signal indicative of the angular deviation amount is derived based on an absolute value of the difference between said count values to generate a correction signal for rotating the optical recording medium to correct the angular deviation of said optical recording medium.

* * * * *